United States Patent [19]

Spurrier et al.

[11] 4,430,304
[45] Feb. 7, 1984

[54] SLAB REFORMER

[75] Inventors: Francis R. Spurrier, Whitehall; Egon A. DeZubay, Mt. Lebanon; Alexander P. Murray, Murrysville; Edward J. Vidt, Churchill, all of Pa.

[73] Assignee: The United States of America as represented by the United States Department of Energy, Washington, D.C.

[21] Appl. No.: 321,131

[22] Filed: Nov. 13, 1981

[51] Int. Cl.³ .............................................. F28D 21/00
[52] U.S. Cl. ........................................ 422/204; 48/61; 422/202; 422/205; 422/211
[58] Field of Search ............... 422/201, 202, 204, 205, 422/211, 305, 218; 48/61, 94, 214 A, 105, 196 A

[56] References Cited

U.S. PATENT DOCUMENTS

| | | |
|---|---|---|
| 1,915,363 | 6/1933 | Hanks et al. . |
| 1,934,836 | 11/1933 | Wietzel et al. . |
| 1,959,151 | 5/1934 | Beekley ........................... 422/218 X |
| 2,029,317 | 2/1936 | Guyer et al. ........................... 48/94 |
| 2,361,020 | 10/1944 | Gibb . |
| 2,565,395 | 8/1951 | Scharmann . |
| 2,625,470 | 1/1953 | Roberts, Jr. . |
| 3,215,502 | 11/1965 | Korwin . |
| 3,334,971 | 8/1967 | James et al. . |
| 3,450,507 | 6/1969 | Korwin ............................... 48/94 X |
| 3,453,146 | 7/1969 | Bawa et al. ........................ 48/105 X |
| 3,528,783 | 9/1970 | Haselden ........................... 422/211 X |
| 3,541,729 | 11/1970 | Dantowitz ............................. 48/94 |
| 3,607,125 | 9/1971 | Kydd ................................... 48/94 X |
| 3,635,682 | 1/1972 | Vine et al. ........................... 48/94 X |
| 3,645,701 | 2/1972 | Banchik et al. . |
| 3,650,697 | 3/1972 | Goebel . |
| 3,656,913 | 4/1972 | Blaha et al. . |
| 3,899,420 | 8/1975 | Nozawa et al. . |
| 3,909,299 | 9/1975 | Corrigan ............................... 48/94 X |
| 3,944,394 | 3/1976 | McClintock et al. . |
| 3,958,951 | 5/1976 | Woebcke et al. . |
| 3,962,411 | 6/1976 | Setzer et al. ..................... 422/211 X |
| 3,971,847 | 7/1976 | Houseman ..................... 48/197 R X |
| 3,980,440 | 9/1976 | Morse et al. ......................... 48/94 X |
| 4,071,330 | 1/1978 | Sederquist .............................. 48/94 |
| 4,098,587 | 7/1978 | Krar et al. ............................. 48/94 |
| 4,098,588 | 7/1978 | Buswell et al. ........................ 48/94 |
| 4,098,589 | 7/1978 | Buswell et al. ........................ 48/94 |
| 4,113,441 | 9/1978 | Suzuki et al. ................. 48/196 A X |
| 4,127,389 | 11/1978 | Hackemesser et al. ............. 422/201 |
| 4,203,950 | 5/1980 | Sederquist ......................... 48/94 X |

FOREIGN PATENT DOCUMENTS 2705324 8/1978 Fed. Rep. of Germany .

OTHER PUBLICATIONS

Olesen et al., "The UTC Steam Reformer", UTC, Santa Barbara, Calif., Oct. 23-25, 1979.

Primary Examiner—Richard L. Chiesa
Attorney, Agent, or Firm—W. E. Otto; E. L. Levine

[57] ABSTRACT

Slab-shaped high efficiency catalytic reformer configurations particularly useful for generation of fuels to be used in fuel cell based generation systems. A plurality of structures forming a generally rectangular peripheral envelope are spaced about one another to form annular regions, an interior annular region containing a catalytic bed and being regeneratively heated on one side by a hot comubstion gas and on the other side by the gaseous products of the reformation. An integrally mounted combustor is cooled by impingement of incoming oxidant.

12 Claims, 14 Drawing Figures

4,430,304

SLAB REFORMER

GOVERNMENT CONTRACT

The invention disclosed herein was made or conceived in the course of or under contractual agreements with the U.S. Government identified as Nos. DE-AC-03-78-E-11300 (DOE) and DEN3-161 (NASA).

BACKGROUND OF THE INVENTION

1. Field of the Invention

This invention relates to catalytic gas reformers useful to convert a reformable medium to a usable fuel, and more particularly provides reformers of novel non-tubular geometries useful to convert mediums such as hydrocarbons to fuels such as hydrogen and carbon monoxide for use in fuel cell based systems.

2. Description of the Prior Art

Reformers are used throughout process industries to produce a fuel, such as a hydrogen rich stream, by catalytically reacting steam and a hydrocarbon at high temperatures, typically above 1,000° F. The reforming reactions are highly endothermic. The hydrogen is usually consumed on sight by any of several processes, for example, ammonia synthesis, de-aromatization, and hydrodesulfurization. In many cases, methane is used as the hydrocarbon. Large, industrial steam/methane reformer systems operate at 10 to 20 atmospheres of pressure and high gas temperatures in the range of 1500° to 2000° F. These operating conditions have been carried out through a tubular design, primarily for stress and strength considerations. Catalytic bed volume in these units typically has considerable excess capacity, on the order of 50%. Hence, reformer tube dimensions of up to 6 inches in diameter by 30 to 50 feet long are common in refinery operations.

Furthermore, unit thermal efficiency of the large industrial reformers is low, but the actual overall system efficiency is substantially higher as the waste heat and undesired products are often utilized by other site processes.

A stand-alone reformer, producing hydrogen for a fuel cell based generation system, should preferably achieve higher unit efficiencies. Therefore, increasing heat transfer and hydrogen production while decreasing waste heat, size, and undesirable byproducts becomes of high importance.

A high efficiency tubular design has been presented, and is described in a paper presented by O. L. Oleson et al, October, 1979, entitled "The UTC Steam Reformer". Similar reformer designs are described in U.S. Pat. Nos. 4,071,330, 4,098,587, 4,098,588, 4,098,589, and 4,203,950, issued to United Technologies Corporation. The designs all include regenerative heat exchange for thermal efficiency, and a tubular arrangement. While designs of this type will perform admirably, improvements can be made. Units which are lower in cost and easier to fabricate and assemble are desirable. Additionally, reformers having configurations more compatible with the addition of fins, pins, or other heat transfer augmentation means are more attractive. And, reformers offering higher heat transfer area per unit bed volume will increase efficiency.

It is thus desirable to provide reformers which offer advantages in these areas. It is particularly beneficial to provide efficient catalytic reformers useful in the preparation of fuels such as hydrogen and carbon monoxide for utilization in fuel cell based power generation systems.

SUMMARY OF THE INVENTION

This invention provides efficient catalytic reformers, and particularly reformer configurations, useful in the provision of fuels such as hydrogen and carbon monoxide for fuel cell based systems. As opposed to the tubular configurations of the prior art, the reformers are based on a so-called flat slab geometry. For descriptive purposes, and in its most general form, a preferred embodiment is generally rectangular in cross section. Included are three elongated ducts of rectangular cross-section having parallel sides with the rectangular structures oriented with common axes. This forms a central chamber bounded externally by an annular region which contains a catalytic material, and which is in turn bounded by an annular passage. In one embodiment a reformable gaseous medium, such as a mixture of methane and steam, flows in one direction through the catalytic annular region, is reformed to a useful fuel, turns 180°, and flows counter-directional through the central chamber. A hot gas, preferably the product of a combustion reaction, flows through the outer annular passage in the same direction as the reformed product gases and, accordingly, counter-directional to the input methane and steam mixture. A similar structural arrangement can also be utilized where the methane mixture again flows through the catalytic annular region, but where the product fuel flows through the outer annular passage and the combustion gas flows through the central chamber. The counter-directional flow relation, that is, with the gas in the central chamber and annular passage flowing in a common direction and the gas in the intermediate annular region flowing counter-directional through a catalytic bed, is maintained.

Other embodiments advantageously used corrugated or convoluted structures. In one preferred form a corrugated shell forms plural chambers which together form an outer envelope approximating a rectangular cross-sectional configuration. This configuration can also be described as a corrugated rectangular structure. Surrounding each chamber are regions, formed within a corrugated duct, containing catalytic material, the outer envelope of the totality of which also approaches a slab or rectangular configuration. These structures are integrated into a module, which is affixed at one end to a corrugated casing and free to slidably expand within the casing. The casing includes corrugations preferably at 90° to the corrugations of the shell and duct. Gases from a combustion reaction in a combustor which is cooled by impingement of incoming oxidant, flow through the inner chambers.

BRIEF DESCRIPTION OF THE DRAWINGS

The advantages, nature and additional features of the invention will become more apparent from the following description taken in connection with the accompanying drawing in which.

DESCRIPTION OF THE PREFERRED EMBODIMENTS

Figure 1:
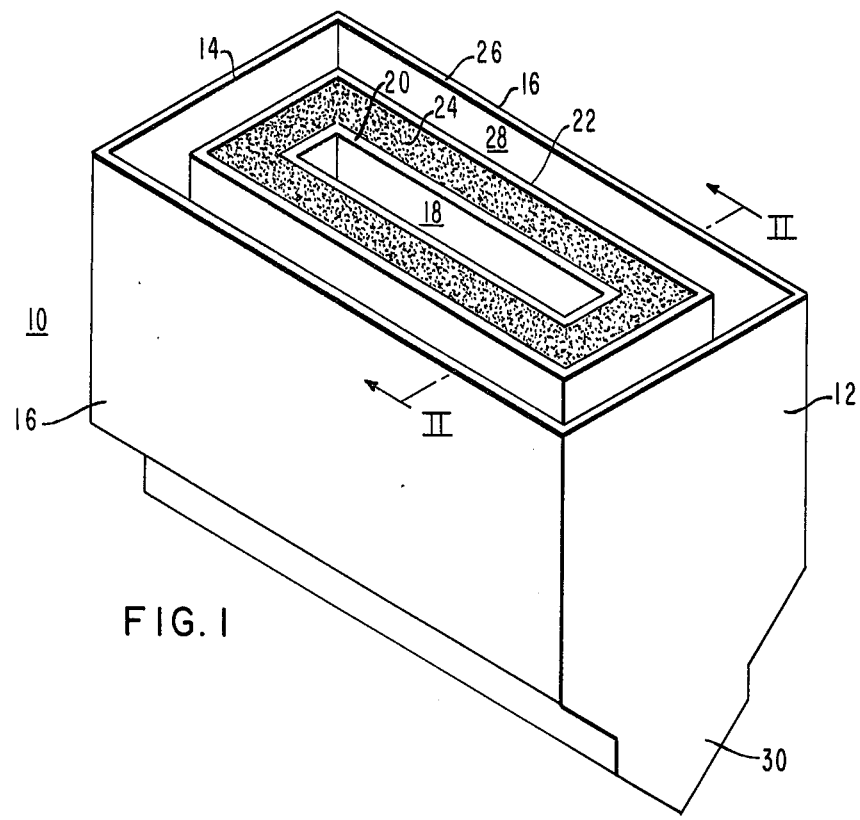
FIG. 1 is a schematic perspective view of a simplified reformer in accordance with the invention.
Figure 2:
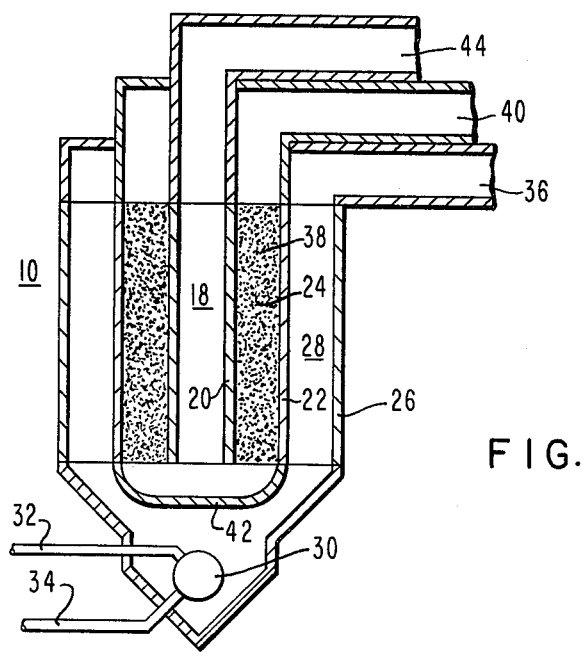
FIG. 2 is a sectional elevation view taken at II—II of FIG. 1, particularly showing flow paths of the various gaseous mediums.
Figure 13:
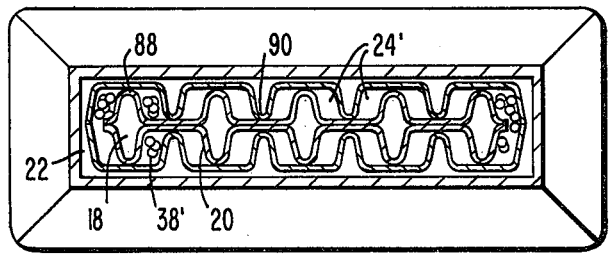
FIG. 13 is an elevational section view taken at XIII—XIII of FIG. 11, with some detail omitted for clarity.

Referring now to FIGS. 1 and 2 there is shown a reformer 10. The reformer in accordance with the invention is referred to as a slab, or flat slab, or hollow slab, since it is comprised of components having at least two edges 12, 14 which are shorter than a third side 16, as opposed, for example, to a circular cross-section or tubular geometry. The edges and sides need not be flat. The reformer includes one or more chambers 18 formed within a shell 20. The shell 20 can be comprised of multiple interconnected pieces. Laterally surrounding at least a significant portion of the axial length (the vertical direction in FIGS. 1 and 2) of the shell 20 is a duct 22. The duct 22 is spaced from the shell 20 so as to form an annular region 24, or a plurality of regions 24' as discussed particularly with respect to FIG. 13, between the duct 22 and shell 20. Laterally surrounding at least a significant portion of the axial length of the duct 22 is a casing 26. The casing 26 is spaced from the duct 22 so as to form an annular passage 28 therebetween. A catalytic material is retained in the annular region 24 to form a catalytic bed 38.

A combustor 30 is preferably associated and integral with the reformer 10. A combustible fuel, such as natural gas or methane, enters the combustor 30 through a conduit 32, and an oxidant, such as air, enters the combustor through another conduit 34. In the embodiment shown best in FIG. 2, the hot combustion gas flows from the combustor 30 to and through the annular passage 28, and is discharged through an outlet 36. A reformable medium, such as a gaseous mixture of methane and steam, enters the catalytic bed 38 retained within the annular region 24 from an inlet 40. The reformable mixture flows through the bed 38 in a path which is generally parallel and counter-directional to the combustion gas. During passage through the bed 38 reformation to a product gas, such as one comprising hydrogen, carbon monoxide, some unreformed methane, and other reaction product constituents, takes place. The reformed product gas then contacts a deflector 42, is turned 180°, and flows into and through the central chamber 18. The deflector 42 also functions as an insulating cap to protect the ends of the shell and duct from the high temperatures at the combustor 30. The reformed product gas flows counter-directional to the unreformed inlet gaseous mixture, and is discharged through an outlet 44. It will be apparent that this configuration and flow path provides a large surface area catalytic bed and heat energy to the catalytic bed 38 from two distinct regenerative sources, the combustion gas and the product gas.

Figure 3:
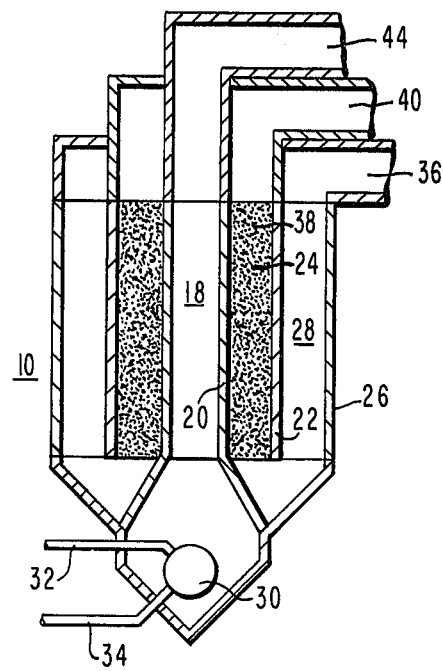
FIG. 3 is a view, similar to FIG. 2, showing alternative flow paths.

The structural embodiment of FIG. 3 utilizes a mechanical configuration similar to that of FIG. 2, including a chamber 18 within a shell 20, a catalytic bed 38 retained in an annular region 24 between the shell 20 and a duct 22, and an annular passage 28 between the duct 22 and a casing 26. Also provided is a combustor 30. Here, however, the hot combustion gas discharged from the combustor 30 flows through the central chamber 18. The reformable medium flows through the catalytic bed 38, is turned, and flows through the annular passage 28. The high surface area catalytic bed and regenerative thermal interexchange are maintained.

Figure 4:
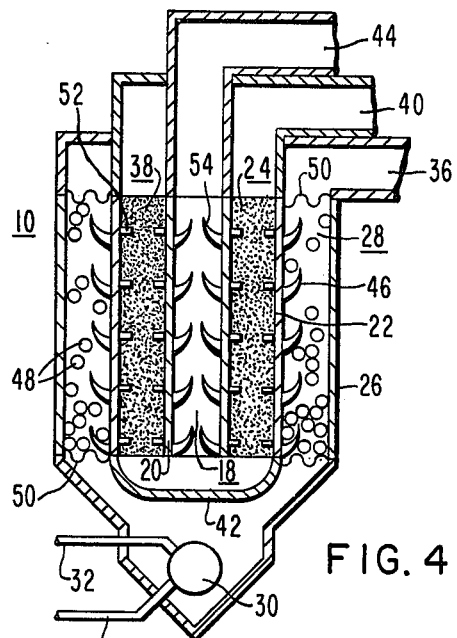
FIG. 4 is a view, similar to FIGS. 1 and 2, schematically showing additional structural features.

In either configuration, the rectangular arrangement is readily compatible with the addition of means for augmenting heat transfer among the flow paths and mediums. FIG. 4 shows the inclusion of fine 46 and alumina balls 48 within the combustion gas annular passage 28. The balls 48 are maintained within the passage 28 through use of mesh screens 50. The screens 50 are preferably metallic, and can also comprise refractory ceramic materials. Also shown are pins 52 extending into the catalytic bed 38. Fins 54 are also disposed within the product gas chamber 18.

Figure 5:
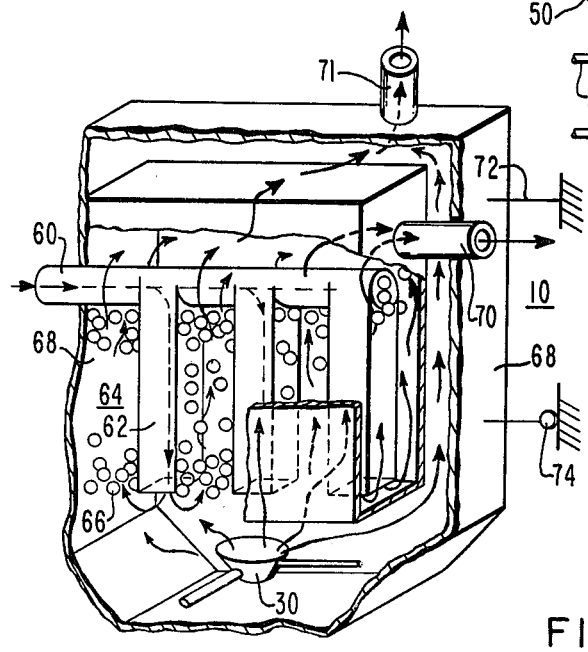
FIG. 5 is a schematic perspective view, partially in section, of another embodiment reformer.

Referring now to FIGS. 5–10, and initially FIG. 5, additional slab reformer 10 configurations are shown. A reformable medium, such as a mixture of methane and steam, enters an inlet manifold 60 which is preferably tubular. The medium then passes in parallel through a plurality of inlet channels 62, is turned 180°, and flows through outlet channels 64, which retain catalytic beds 66. The hot combustion gas discharged from the combustor 30 flows across the channels 62, 64 (above and below the plane of the paper in FIG. 5), and can also flow about the sides 68 of the outer outlet channels 64' before being discharged through an outlet manifold 71. The reformed products are discharged through an outlet manifold 70. For purposes of controlling thermal expansion, one end of the channel structures or the structures immediately surrounding the channels is preferably fixed, shown as support 72, and the other end is free to slide, as shown by rolling support 74.

Figure 6:
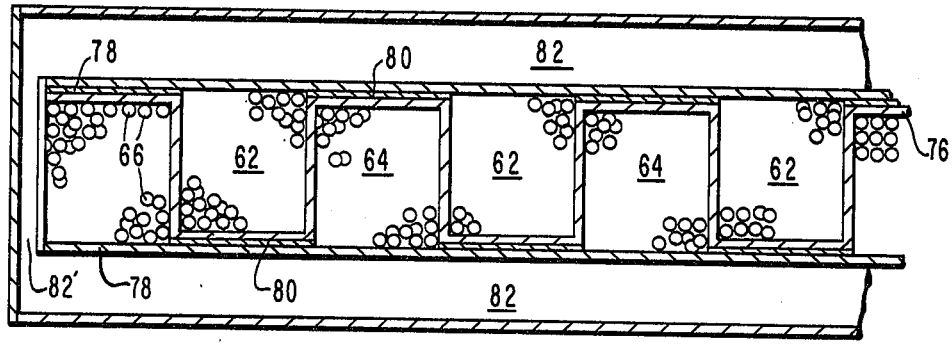
FIGS. 6 and 7 are cross-sectional views of alternative embodiments of the reformer of FIG. 5.
Figure 7:
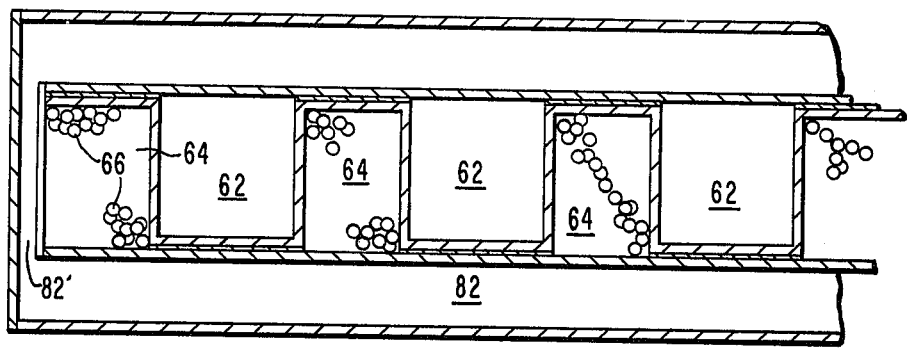

Although other configurations are possible, it is preferred that the channels 62, 64 have a generally U-shaped or rectangular cross-section. FIG. 6 shows a generally square cross-section wherein a catalytic bed 66 is contained within both the inlet channels 62 and outlet channels 64. A corrugated sheet 76 sandwiched between two plates 78 can be utilized to fabricate the structure. To achieve good thermal bonding, brazing 80 can be utilized at selected locations, or along the entire length of the channels 62, 64. FIG. 7 shows similar structure wherein the channels 62 and 64 are of differing area, and catalytic material 66 is incorporated solely in the outlet channels 64. Hot combustion gases flow in the interior sections 82. The side section 82' can be eliminated if desired.

Figure 8:
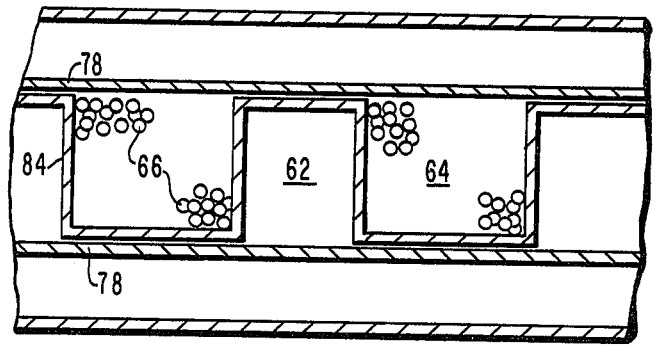
FIGS. 8, 9 and 10 are yet other cross-sectional views of alternate reformer embodiments for the structure of FIG. 5.
Figure 9:
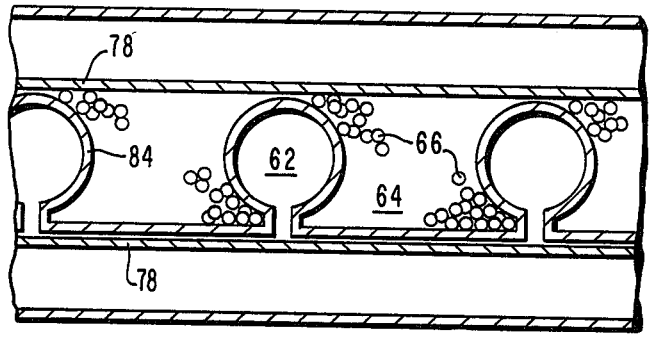
Figure 10:
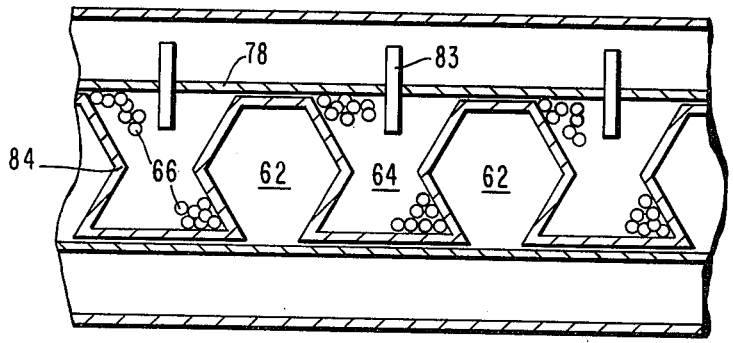
Figure 11:
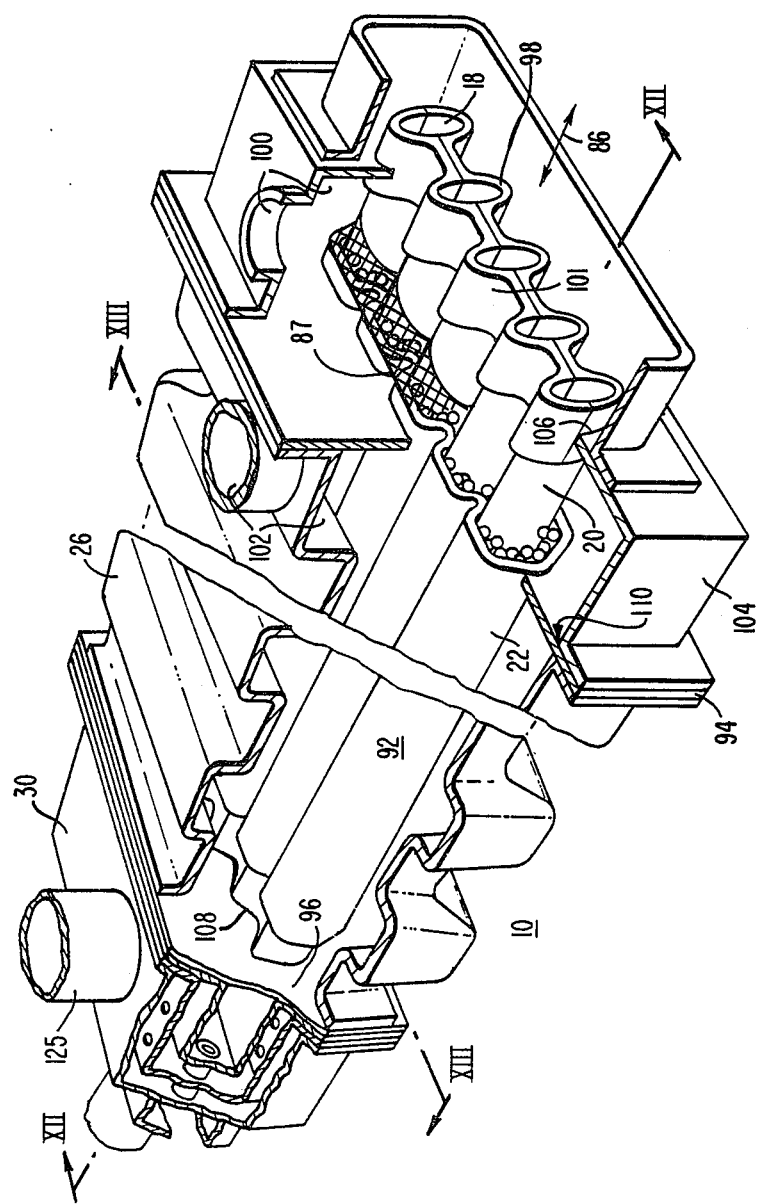
FIG. 11 is a perspective view, partially in section, of another reformer embodiment.
Figure 12:
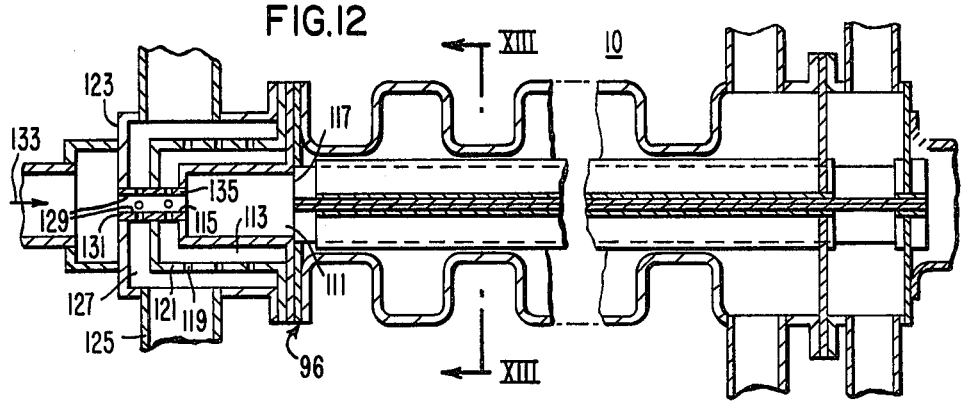
FIG. 12 is an elevational section view taken at XII—XII of FIG. 11.

FIGS. 8–10 show alternative cross-sectional configurations for the inlet 62 and outlet 64 channels, and the catalytic beds 66. FIG. 8 shows a corrugated or "U" channel, FIG. 9 shows circular inlet channels 62, and FIG. 10 shows hexagonal inlet channels 62. Other configurations are equally possible. FIG. 10 additionally shows fins 83 extending from the catalytic beds 66 into the interior section 82 to increase heat transfer into the beds. These figures also show a slight spacing between walls 84 forming the channels 62, 64, and the plates 78 between which the channels are formed. This allows the walls 84 to float freely due to thermal expansion. Although not shown in FIGS. 8–10 for clarity, the walls 84 are affixed, thorugh means such as brazing or welding, at one location along their axial length.

Referring now to FIGS. 11–14 there is shown in more detail reformer structures in accordance with the invention. The structure shown retains the basic flat slab arrangement, and provides highly efficient thermal interexchange among the various mediums and high efficiency reformation capability. For descriptive purposes the reformer 10 is described from the central area outward. As shown best in FIGS. 11 and 13, a corrugated shell 20 forms therein a plurality of chambers 18. An envelope defined about the periphery of the plurality of chambers approaches a generally elongated box in the axial direction of rectangular cross-section. A corrugated duct 22 surrounds at least a substantial portion of the axial length of the shell 20. The axial direction is indicated by the arrow identified by reference numeral 86. While the reformer can be substantially symmetrical about an axis in the axial direction, it need not be so structured. The envelope formed about the periphery of the corrugated duct 22 also approaches a rectangular slab. The duct 22 is spaced from the shell 20 so as to form a plurality of regions 24'. The duct 22 and shell 20 preferably contact one another, such as at locations 88 and 90. These contacts can be fixed through fasteners, welds or other affixing means, at one lateral location or along their common axial lengths. Preferably, however, there is merely a sliding support between these members to allow for thermal expansion.

Figure 14:
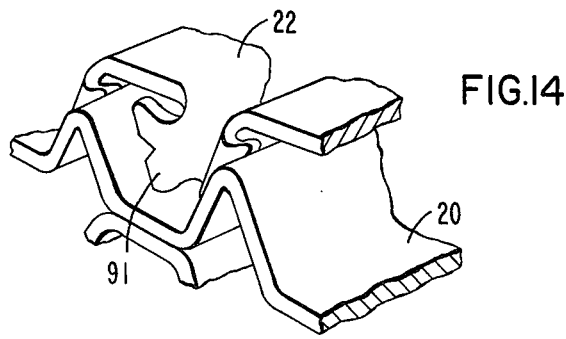
FIG. 14 is a perspective view of a portion of another embodiment of a reformer in accordance with the invention.

Within the chambers 24' are catalytic beds 38'. The beds 38' are preferably comprised of particulates or pellets to provide a large surface area, and are retained in place by a refractory metal or ceramic gauze 87 at the end of duct 22. The gauze is lightly tack-welded to duct 22 or otherwise made readily removable to facilitate catalyst replacement. A bent tab 91 is utilized at the other end of the duct 22 as shown in FIG. 14. The tabs 91 are particularly beneficial in enhancing the cooling of a plate 96 at the end of the duct 22 where the gases change flow direction. The duct-shell-catalyst structure described forms a module 92.

At least a substantial portion of the axial length of the module 92 is contained within a corrugated casing 26. The corrugations of the casing 26 preferably are oriented at an angle to the corrugations of the duct 22 and shell 20, and desirably are orthogonal thereto. The envelope formed by the casing 26 also approaches a slab or rectangular configuration. The casing and associated components form a sealed structure about the enclosed portion of the module 92. The casing 26 is welded to a separator plate 94 at one end, and to plate 96 at the other end. The separator plate 94 is welded or otherwise sealingly affixed to the duct 22.

The separator plate 94 separates a reformable medium inlet manifold 100 from a product gas outlet manifold 102. Also sealingly affixed to the separator plate 94 by a weld 110 is a partition 104 which is sealingly affixed through fastening means such as a weld 106 to the corrugated sleeve 101. The corrugated sleeve is attached, in turn, to the shell 20 by means of a weld 98. Weld 98 is then accessible for grinding to release manifold 100 from shell 20, preparatory to catalyst replacement. The shell 20 is also affixed at its opposite end to the plate 96, through fastening means such as a weld 108. In this manner, the corrugated casing 26 provides lateral bending stiffness and strength to withstand internal pressures. Additionally, differential thermal growth which will occur between the shell 20 and the casing 26 is accommodated by local bending of the corrugated casing 26, as in a bellows. The duct 22, being fixed at one end only, is free to slidingly move with respect to the casing. Strength and stiffness in the axial direction are provided by the shell 20.

When welds 98 and 110 are cut for removal of the manifold 100, the partition 104 is removable with the corrugated sleeve 101 which remains attached thereto through weld 106. This allows access to the catalytic bed.

Affixed to the opposite side of plate 96 is the combustor 30. A combustion reaction occurs in a combustion chamber 111 formed within a liner 113 having an inlet 115 and outlet 117. The outlet 117 communicates directly with the chambers 18 within the corrugated shell 20. The liner 113 is cooled by impingement of multiple jets of an oxident, such as air, flowing through holes 119 in a baffle 121 disposed about the liner 113. The air enters a frame 123 disposed about the baffle 121 through one or more inlets 125. Upon entering a flow annulus 127 disposed between the frame 123 and baffle 121, the flow splits such that a first portion flows through the impingement holes 119 and a second portion flows to openings 129 in one or more mixing tubes 131. A combustible fuel enters each mixing tube 131 through an inlet 133. The openings 129 in each mixing tube 131 allow premixing of the air and fuel prior to entering the flame zone within the liner 113.

The mixing tube 131 is welded to the frame 123, and is free to slidably expand through supports in the liner 113 and baffle 121. If desired, additional air and fuel mixing or local cooling can be accommodated through additional openings in the liner 113, such as openings 135.

Since numerous changes may be made in the above-described apparatus without departing from the spirit and scope thereof, it is intended that all matter contained in this disclosure be interpreted as ilustrative, and not in a limiting sense.

We claim:

1. A catalytic reformer comprising:
   a hollow elongated flat non-circular slab;
   a duct disposed horizontally within said slab and extending along a longitudinal axis of said slab, said duct forming a first annular region between said slab and said duct;
   a shell disposed within said duct forming a second annular region between said duct and said shell;
   a bed of catalytic material disposed within said second annular region within said slab;
   means for flowing a reformable gaseous medium through said bed; and
   means for heating said bed from within said slab.

2. A catalytic reformer comprising:
   an elongated corrugated shell forming therein an elongated chamber;
   an elongated corrugated duct spaced about at least a portion of said shell so as to form an annular region therebetween, the corrugations of said duct being generally aligned with the corrugations of said shell;
   a catalyst disposed within said annular region;
   an elongated corrugated casing spaced about at least a portion of said duct, the corrugations of said casing being oriented at an angle with respect to the corrugations of said shell and duct;

means for creating a hot gaseous stream;

means for flowing said hot gaseous stream in a first direction through said elongated chamber; and means for flowing a reformable gaseous medium through said annular region counter-directional to said first direction and for flowing the product gas from said annular region between said duct and casing in said first direction.

3. The reformer of claim 2 wherein said means for creating a hot gaseous stream comprise a liner forming therein a combustion zone, a conduit for conducting a combustible fuel into said combustion zone, a conduit for transporting an oxidant, and a baffle for impinging said oxidant from said oxidant conduit onto the exterior of said liner and then directing said oxidant into said combustion zone.

4. The reformer of claim 3 further comprising a frame spaced about at least a portion of said baffle, said frame being oriented to direct a first portion of said oxidant through said baffle and to direct a second portion of said oxidant into said fuel upstream of said combustion zone.

5. The reformer of claim 4 wherein said shell, duct, casing, liner, baffle and frame consist of metal.

6. The reformer of claim 2 wherein said catalyst comprises particulate solids and further comrising means for retaining said catalyst within said annular region.

7. The reformer of claim 6 wherein said retaining means comprise a gas permeable mesh extending between said shell and duct.

8. The reformer of claim 6 wherein said retaining means comprise a bent tab extending from an end of said duct across a portion of said annular region.

9. The reformer of claim 2 wherein said shell, duct, and casing consist of metal.

10. The reformer of claim 2 wherein said duct is fixedly mounted to said casing at an end of said duct, and the balance of said duct is slidably supported within said casing.

11. A catalytic reformer having a catalyst-containing module comprising:

said module including:
an elongated corrugated shell forming a plurality of combustion gas chambers therein;
an elongated corrugated duct spaced about at least a portion of said shell, and forming a plurality of regions therebetween, the corrugations of said duct being parallel to the corrugations of said shell; and
a catalyst bed retained within said annular regions;

a convoluted casing spaced about a portion of said duct and removably mounted at one end to said duct, the corrugations of said casing being angled with respect to the corrugations of said duct and shell;

means for flowing a hot gas through said chambers; and means for flowing a reformable gaseous medium through said catalyst bed.

12. A catalytic reformer comrising:

a plurality of axially elongated generally oval-shaped mechanically interconnected parallel shells, each said shell forming therein a chamber;

a plurality of axially elongated generally rectangularly shaped mechanically interconnected parallel ducts, each said duct radially surrounding at least a portion of a corresponding, parallel chamber, each said shell and duct being partially spaced from one another and in contact with one another at each of their two shorter sides, forming between each said shell and duct a plurality of regions;

a catalytic bed retained within each said region;

a sealed casing enclosing at least a portion of each said duct;

means for flowing a hot gas through said chambers; and means for flowing a reformable gas through said catalytic beds counter-directional to the flow of said hot gas.

* * * * *